United States Patent
Hosotani

(10) Patent No.: US 11,011,937 B2
(45) Date of Patent: May 18, 2021

(54) HIGH FREQUENCY POWER SUPPLY DEVICE

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 16/717,637

(22) Filed: Dec. 17, 2019

(65) Prior Publication Data

US 2020/0127497 A1 Apr. 23, 2020

Related U.S. Application Data

(63) Continuation of application No. PCT/JP2018/023278, filed on Jun. 19, 2018.

(30) Foreign Application Priority Data

Jul. 10, 2017 (JP) .............................. JP2017-134284

(51) Int. Cl.
 *H02J 50/12* (2016.01)
 *H02M 1/34* (2007.01)
 *H02M 1/00* (2006.01)

(52) U.S. Cl.
 CPC ............... *H02J 50/12* (2016.02); *H02M 1/34* (2013.01); *H02M 2001/0058* (2013.01)

(58) Field of Classification Search
 CPC ............ H02J 50/05; H02J 50/10; H02J 50/12; H02M 1/34; H02M 2001/0058;
 (Continued)

(56) References Cited

U.S. PATENT DOCUMENTS 3,842,338 A * 10/1974 Walden ................ H05B 6/1281
 363/124
4,092,509 A * 5/1978 Mitchell ................ H02M 5/27
 219/625

(Continued)

FOREIGN PATENT DOCUMENTS

JP S60-9380 A 1/1985
JP H11-103577 A 4/1999
(Continued)

OTHER PUBLICATIONS

International Search Report issued in PCT/JP2018/023278; dated Aug. 7, 2018.
(Continued)

*Primary Examiner* — Adolf D Berhane
(74) *Attorney, Agent, or Firm* — Studebaker & Brackett PC

(57) ABSTRACT

A switching circuit is connected to an output side of a DC power supply, includes a low-side switch circuit and a high-side switch circuit, and generates high frequency power by switching of the low-side switch circuit and the high-side switch circuit. Snubber circuits are connected between both ends of the low-side switch circuit and both ends of the high-side switch circuit. The snubber circuits include series circuits including inductors and capacitors, and include diodes that are connected in parallel with the inductors.

16 Claims, 13 Drawing Sheets

111

(58) Field of Classification Search
CPC ..... H02M 2001/342; H02M 2001/344; H02M 2001/346; H02M 2001/348; H02M 2001/385; H02M 1/38
See application file for complete search history.

(56) References Cited

U.S. PATENT DOCUMENTS

| | | | | |
|---|---|---|---|---|
| 5,260,607 | A | * | 11/1993 | Kinbara .............. H02M 7/5387 327/427 |
| 5,317,122 | A | * | 5/1994 | Ito .......................... B23H 1/022 219/69.18 |
| 2019/0341809 | A1 | * | 11/2019 | Nakao ...................... H02J 50/50 |
| 2019/0372455 | A1 | * | 12/2019 | Cheng ...................... H02M 1/14 |
| 2020/0287461 | A1 | * | 9/2020 | Zou ......................... H02M 3/158 |

FOREIGN PATENT DOCUMENTS

| | | |
|---|---|---|
| JP | 2012-039707 A | 2/2012 |
| JP | 2016-182002 A | 10/2016 |
| WO | 2012/101907 A1 | 8/2012 |

OTHER PUBLICATIONS

International Preliminary Report on Patentability and Written Opinion issued in PCT/JP2018/023278; dated Jan. 14, 2020.

* cited by examiner

HIGH FREQUENCY POWER SUPPLY DEVICE

CROSS-REFERENCE TO RELATED APPLICATIONS

This application claims benefit of priority to International Patent Application No. PCT/JP2018/023278, filed Jun. 19, 2018, and to Japanese Patent Application No. 2017-134284, filed Jul. 10, 2017, the entire contents of each are incorporated herein by reference.

BACKGROUND

Technical Field

The present disclosure relates to a high frequency power supply device that includes a high frequency power generation circuit connected to a DC power supply and generating high frequency power using a switching circuit allowing a switch element to be switched at a high frequency.

Background Art

A power supply device that is connected to a DC power supply, converts the DC power supply into high frequency power by switching of a switch element, and supplies power via the high frequency power is used for, for example, a wireless power transfer system.

For example, in WO 2012/101907, a configuration that includes a high frequency power generation circuit connected to an output side of a DC power supply and including a switching circuit including a high-side switch element and a low-side switch element and transfers power from a power transmission device to a power reception device, is described.

SUMMARY

In a high frequency power generation circuit that is connected to an output side of a DC power supply and includes a switching circuit including a high-side switch element and a low-side switch element, the voltage waveform of high frequency power output from the switching circuit is a square wave form or a trapezoidal wave form.

As described above, in the case where the voltage waveform is a square wave form or a trapezoidal wave form, the waveform of a current flowing through a coil or an antenna connected to the output side of the switching circuit is a waveform approximated to a sine wave form, due to a resonant operation of a circuit through which the current flows. However, there is a problem of harmonic wave noise caused by harmonic wave components contained in the current waveform being emitted from the coil or the antenna.

Thus, the present disclosure provides a high frequency power supply device that reduces harmonic wave components contained in a current waveform of high frequency power output from a switching circuit and thus prevents or reduces emission of harmonic wave noise. Furthermore, another object of the present disclosure is to provide a high frequency power supply device that is capable of reducing harmonic wave components contained in the current waveform of high frequency power output from the switching circuit and thus preventing or reducing emission of harmonic wave noise both in the case where an operation for reducing switching loss is achieved by attaining a zero voltage switching (soft switching) operation and in the case where a non-zero voltage switching operation (hard switching) is performed instead of attaining the zero voltage switching (soft switching) operation.

(1) A high frequency power supply device according to the present disclosure includes a high frequency power generation circuit that is connected to a DC power supply, includes a low-side switch element and a high-side switch element, and generates high frequency power by switching of the low-side switch element and the high-side switch element; a low-side snubber circuit that is connected between both ends of the low-side switch element; and a high-side snubber circuit that is connected between both ends of the high-side switch element. The low-side snubber circuit includes a series circuit including a first capacitor and a first impedance element. The high-side snubber circuit includes a series circuit including a second capacitor and a second impedance element. A first end of the first capacitor and a first end of the second capacitor are connected to a connecting point between the low-side switch element and the high-side switch element. The high frequency power supply device further comprises a third capacitor that is connected between a second end of the first capacitor and a second end of the second capacitor.

With the above configuration, a corner part of the waveform of a voltage output from a switching circuit is smoothed, harmonic wave components of current can be reduced, and emission of harmonic wave noise can be reduced.

(2) It is preferable that a capacitance of the third capacitor be set to a value that makes a ratio of time during which a voltage across the first capacitor changes and a ratio of time during which a voltage across the second capacitor changes the same. Thus, harmonic wave current contained in the current output from the high frequency power generation circuit can be reduced.

(3) The first impedance element or the second impedance element is, for example, a resistor element.

(4) The first impedance element or the second impedance element is, for example, an inductor.

(5) It is preferable that the high frequency power supply device further include a first diode that is connected in parallel between both ends of the first impedance element in a direction in which a current for charging the first capacitor flows or a second diode that is connected in parallel between both ends of the second impedance element in a direction in which a current for charging the second capacitor flows.

With the above configuration, a problem in which in the case where the impedance of the first impedance element and the impedance of the second impedance element are different, adverse influence of the difference between the impedances makes the ratio of time during which the voltage across the first capacitor changes and the ratio of time during which the voltage across the second capacitor changes unbalanced, can be solved.

(6) It is preferable that the low-side switch element include a diode that is connected in parallel with the low-side switch element. It is preferable that the high-side switch element include a diode that is connected in parallel with the high-side switch element. It is preferable that under a condition in which a high frequency current flowing in the low-side switch element and the high-side switch element lags a high frequency voltage output from the high-side switch element and the low-side switch element, capacitances of the first capacitor and the second capacitor be set to values for providing a gentle rising slope or a gentle falling slope of a trapezoidal wave voltage, which is the high frequency voltage, while a zero voltage switching operation being attained. It is preferable that under a condition in which the high frequency current leads the high frequency voltage, the capacitances of the first capacitor and the second capacitor be set to values for providing a gentle rising slope or a gentle falling slope of the trapezoidal wave voltage while a non-zero voltage switching operation being performed.

With the above configuration, in the case of lagging of a current, a current flowing to a diode that is connected in parallel with the switch element allows a zero voltage switching (soft switching) operation to be achieved, and switching loss can be reduced. In addition, at the time when the high-side switch element or the low-side switch element is turned OFF, changes of rising and falling of the voltage across the high-side switch element or the low-side switch element becomes gentle by a resonant operation including a capacitor of a snubber circuit, and generation of a harmonic wave current can be reduced. Furthermore, in the case of leading of a current, a zero voltage switching operation is not attained. Instead, a non-zero voltage switching (hard switching) is performed, and switching loss is not reduced. However, at the time when the high-side switch element or the low-side switching element is turned OFF, a capacitor of the snubber circuit is slowly charged. Thus, a change of rising of the voltage across the high-side switch element or the low-side switch element becomes gentle, and generation of a harmonic wave current is reduced. In addition, at the time when the high-side switch element or the low-side switch element is turned ON, an impedance element based on an inductor or a resistor in the snubber circuit reduces a change in the current for suddenly discharging charge charged in the capacitor in the snubber circuit. Thus, a change of falling of the voltage across the high-side switch element or the low-side switch element becomes gentle, and generation of a harmonic wave current can be reduced.

(7) A high frequency power supply device according to the present disclosure includes a high frequency power generation circuit that is connected to a DC power supply, includes a low-side switch element and a high-side switch element, and generates high frequency power by switching of the low-side switch element and the high-side switch element; and a snubber circuit that is connected at least between both ends of the low-side switch element or between both ends of the high-side switch element. It is preferable that the snubber circuit include a series circuit including a capacitor and an inductor or a series circuit including a capacitor and a resistor, and a diode that is connected in parallel with the inductor or the resistor in a direction in which a current for charging the capacitor flows.

With the above configuration, generation of switching loss at the time when the switch element to which the snubber circuit is connected is turned ON and turned OFF can be prevented and reduced. In particular, in the high frequency power generation circuit, even if a condition for a zero voltage switching operation, which is one type of soft switching, is not satisfied, that is, if a condition for hard switching is satisfied, when the switch element is turned ON, with the above configuration, generation of switching loss and heat generation at the time of turning ON at the switch element can be reduced. In a snubber capacitor included in the snubber circuit, at the time when the switch element is turned ON, electrostatic energy based on charge stored during the OFF period of the switch element is moved to a snubber inductor included in the snubber circuit and turns into magnetic energy at the time when the switch element is turned ON. Thus, generation of switching loss at the time when the switch element is turned ON can be reduced. In the case where a configuration in which an inductor is replaced by a resistor is adopted in the above configuration, electrostatic energy based on charge stored during the OFF period of the switch element is consumed as Joule heat at a snubber resistor included in the snubber circuit at the time when the switch element is turned ON. That is, power loss in the switching element can be reduced, and heat generation at the switch element can be reduced. In contrast, at the time when the switch element is turned OFF, irrespective of whether an inductor or a resistor is provided, a current flowing through the snubber diode included in the snubber circuit charges the snubber capacitor, makes a voltage change in the snubber capacitor gentle, and reduces switching loss. Furthermore, generation of a switching surge voltage can also be prevented. Accordingly, pressure breakdown at the switch element can be prevented, and the reliability of the circuit can be increased.

(8) It is preferable that the low-side switch element include a diode that is connected in parallel with the low-side switch element. It is preferable that the high-side switch element include a diode that is connected in parallel with the high-side switch element. It is preferable that under a condition in which a high frequency current flowing in the low-side switch element and the high-side switch element lags a high frequency voltage output from the high-side switch element and the low-side switch element, a capacitance of the capacitor included in the snubber circuit be set to a value for providing a gentle rising slope or a gentle falling slope of a trapezoidal wave voltage, which is the high frequency voltage, while a zero voltage switching operation being attained. It is preferable that under a condition in which the high frequency current leads the high frequency voltage, the capacitance of the capacitor included in the snubber circuit be set to a value for providing a gentle rising slope or a gentle falling slope of the trapezoidal wave voltage while a non-zero voltage switching operation being performed.

With the above configuration, a corner part of the waveform of a voltage output from the switching circuit is smoothed, harmonic wave components of the current can be reduced, and emission of harmonic wave noise can be reduced.

(9) The low-side switch element and the high-side switch element be a MOS-FET including a structurally configured parasitic diode. Thus, a diode that is connected in parallel with the switch element is not necessarily provided separately. Alternatively, the current capacity of the diode can be reduced, and miniaturization of the circuit can be achieved.

(10) It is preferable that the low-side switch element and the high-side switch element be compound semiconductor elements. For example, with the use of a compound semiconductor element made of gallium nitride, silicon carbide, or the like, the magnitude of a structurally configured parasitic capacitance Cds can be reduced. Furthermore, a high-speed switching operation can be performed. Therefore, switching loss, in particular, switching loss in the case of a non-zero voltage switching operation (hard switching), can be reduced, and higher efficiency in power conversion and miniaturization of the circuit can be achieved.

According to the present disclosure, a high frequency power supply device in which harmonic wave components contained in a current waveform of high frequency power output from a switching circuit can be reduced and emission of harmonic wave noise can thus be reduced, can be obtained.

DETAILED DESCRIPTION

First Embodiment

Figure 1:
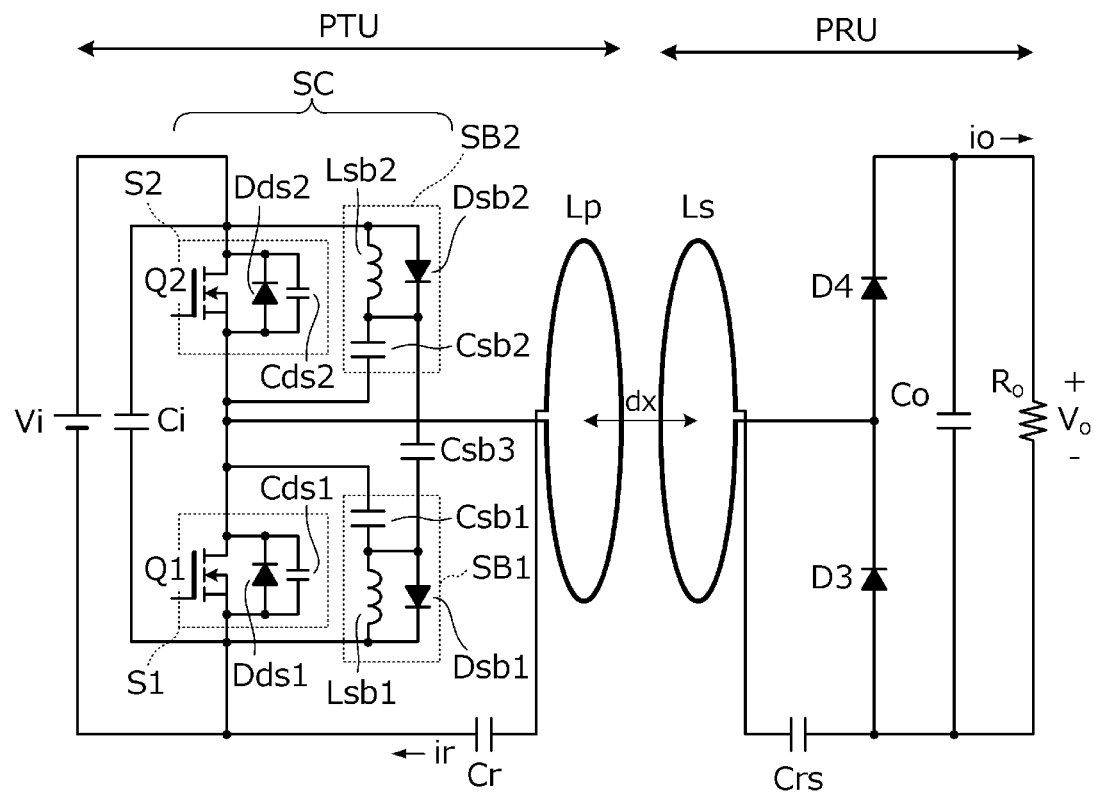
FIG. 1 is a circuit diagram of a power transfer system that includes a high frequency power supply device according to a first embodiment.

FIG. 1 is a circuit diagram of a power transfer system that includes a high frequency power supply device according to a first embodiment of the present disclosure.

A power transfer system 111 includes a power transmission device PTU and a power reception device PRU. The power transmission device PTU is an example of a "high frequency power supply device" according to the present disclosure.

The power transfer system 111 is a system that causes the power transmission device PTU to supply stable DC energy to the power reception device PRU.

The power transmission device PTU includes a DC power supply Vi, a switching circuit SC that is connected to an output side of the DC power supply Vi and generates high frequency power, a snubber circuit SB1 that is connected between both ends of a low-side switch circuit S1 included in the switching circuit SC, and a snubber circuit SB2 that is connected between both ends of a high-side switch circuit S2. The switching circuit SC is an example of a "high frequency power generation circuit" according to the present disclosure.

The switching circuit SC includes the low-side switch circuit S1 and the high-side switch circuit S2. The low-side switch circuit S1 includes a low-side switch element Q1, a diode Dds1 connected across the low-side switch element Q1, and a capacitor Cds1. In a similar manner, the high-side switch circuit S2 includes a high-side switch element Q2, a diode Dds2 connected across the high-side switch element Q2, and a capacitor Cds2.

A series circuit including a power transmission coil Lp and a resonant capacitor Cr is connected between the ground and a connecting point between the high-side switch circuit S2 and the low-side switch circuit S1. The power transmission coil Lp and the resonant capacitor Cr form a resonant circuit. The switching frequencies of the switch elements Q1 and Q2 are the same as the resonant frequency of the resonant circuit or frequencies close to the resonant frequency.

In this embodiment, the low-side switch element Q1 is a MOS-FET, the diode Dds1 is a body diode for the low-side switch element Q1, and the capacitor Cds1 is a parasitic capacitor between the drain and source of the low-side switch element Q1. In a similar manner, the high-side switch element Q2 is a MOS-FET, the diode Dds2 is a body diode for the high-side switch element Q2, and the capacitor Cds2 is a parasitic capacitor between the drain and source of the high-side switch element Q2.

A switching control circuit, which is not illustrated in the drawing, is connected to the gates of the switch elements Q1 and Q2.

The snubber circuit SB1 mentioned above includes a series circuit including an inductor Lsb1 and a first capacitor Csb1 and includes a diode Dsb1 that is connected in parallel with the inductor Lsb1. In a similar manner, the snubber circuit SB2 includes a series circuit including an inductor Lsb2 and a second capacitor Csb2 and includes a diode Dsb2 that is connected in parallel with the inductor Lsb2. Furthermore, the power transmission device PTU further includes a third capacitor Csb3 that is connected between a second end of the first capacitor Csb1 and a second end of the second capacitor Csb2.

In contrast, the power reception device PRU includes a power reception coil Ls, a resonant capacitor Crs, rectifier diodes D3 and D4, and a smoothing capacitor Co. The power reception device PRU is also configured to supply DC power to a load Ro.

The power reception coil Ls is arranged separately from the power transmission coil Lp with a distance dx therebetween, and the power reception coil Ls and the power transmission coil Lp are magnetically coupled. By alternately turning ON and OFF the low-side switch element Q1 and the high-side switch element Q2 in the power transmission device PTU, high frequency power is generated, and the high frequency power is transferred, using magnetic coupling between the power transmission coil Lp and the power reception coil Ls, to the power reception device PRU.

The power reception device PRU rectifies and smooths a high frequency voltage by resonance between the power reception coil Ls and the resonant capacitor Crs, and supplies DC power to the load Ro.

Figure 2:
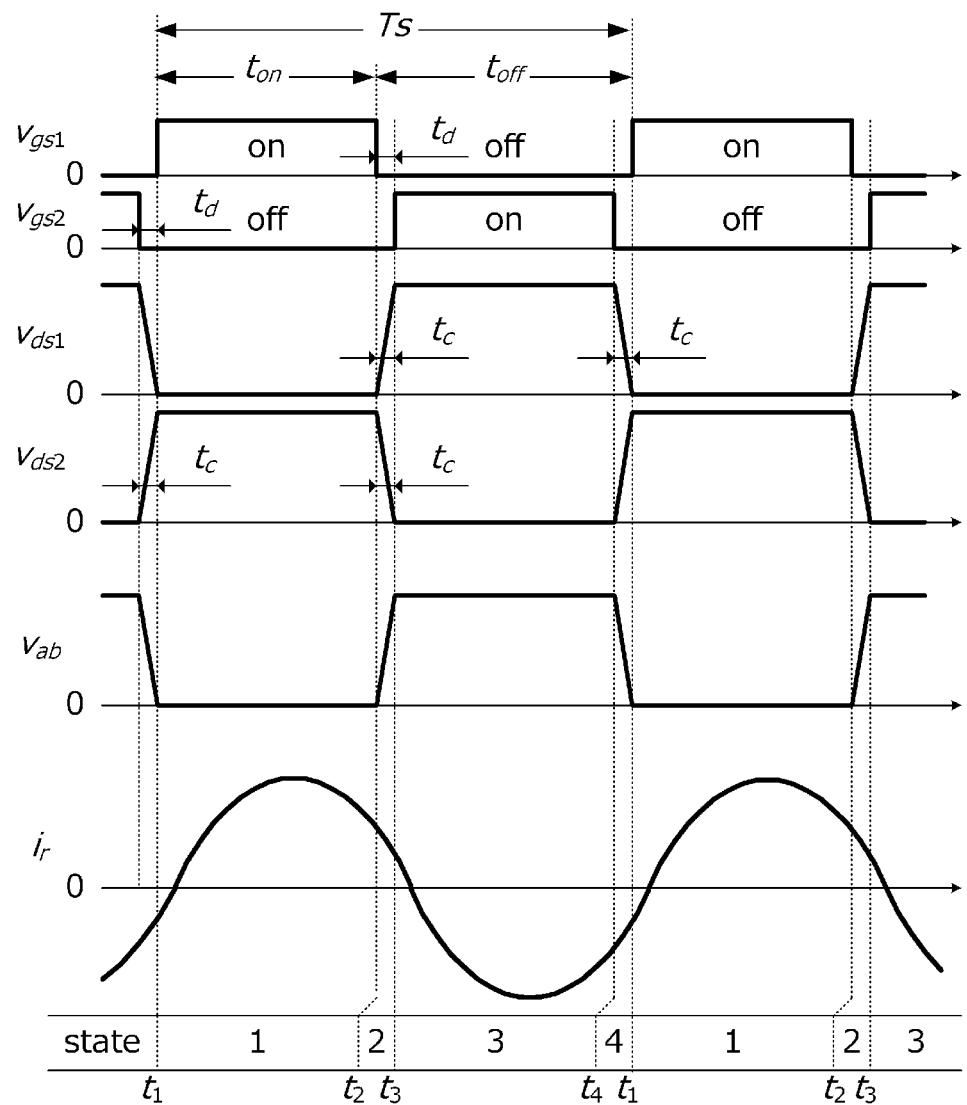
FIG. 2 is a waveform chart of individual units at the time when a power transmission device illustrated in FIG. 1 performs a ZVS operation.

FIG. 2 is a waveform chart of individual units at the time when the power transmission device PTU illustrated in FIG. 1 performs a zero voltage switching (ZVS) operation.

In FIG. 2, the voltage between the gate and source of the switch element Q1 and the voltage between the gate and source of the switch element Q2 are represented by Vgs1 and Vgs2, respectively, and the voltage between the drain and source of the switch element Q1 and the voltage between the drain and source of the switch element Q2 are represented by Vds1 and Vds2, respectively. Furthermore, the voltage at the connecting point between the low-side switch circuit S1 and the high-side switch circuit S2 is represented by Vab, and the current flowing through the power transmission coil Lp is represented by ir. Furthermore, ton represents an ON time of the low-side switch element Q1, toff represents an OFF time of the low-side switch element Q1, and Ts represents a switching period.

The switch elements Q1 and Q2 are alternately turned ON and OFF with a short dead time td, during which both the switch elements are OFF, interposed therebetween. The switch elements Q1 and Q2 perform a ZVS operation by commutating the current flowing in Q1 and Q2 during the dead time period. Operation in individual states during a switching period will be described below.

(1) State 1: time t1 to time t2

First, the diode Dds1 is electrically connected. During a conduction period of the diode Dds1, turning ON of the switch element Q1 allows a ZVS operation to be performed, thus the switch element Q1 being electrically connected.

After that, the switch element Q1 is turned OFF, and a state 2 is entered.

(2) State 2: time t2 to time t3

The parasitic capacitor Cds1 is charged, and the parasitic capacitor Cds2 is discharged. When the voltage Vds1 reaches the voltage Vi of the DC power supply Vi and the voltage Vds2 reaches 0 V, the diode Dds2 is electrically connected, and a state 3 is entered. That is, after Vgs1 drops to "L" and the dead time td passes, Vgs2 rises to "H".

(3) State 3: time t3 to time t4

During a conduction period of the diode Dds2, turning ON of the switch element Q2 allows a ZVS operation to be performed, and the switch element Q2 is electrically connected.

After that, the switch element Q2 is turned OFF, and a state 4 is entered.

(4) State 4: time t4 to time t1

The parasitic capacitor Cds1 is discharged, and the parasitic capacitor Cds2 is charged. When the voltage Vds1 reaches 0 V and the voltage Vds2 reaches Vi, the diode Dds1 is electrically connected, and the state 1 is entered again.

The above-mentioned states 1 to 4 are repeated periodically.

FIGS. 3A to 3D are diagrams illustrating operation of a high-side snubber circuit connected to the high-side switch circuit. In particular, FIGS. 3A to 3D are diagrams illustrating operation of a snubber circuit under a condition in which a high frequency current flowing in the switch element Q1 or the switch element Q2 leads a high frequency voltage output from the switch element Q1 or the switch element Q2, that is, in the case where a non-zero voltage switching operation is performed.

Figure 4:
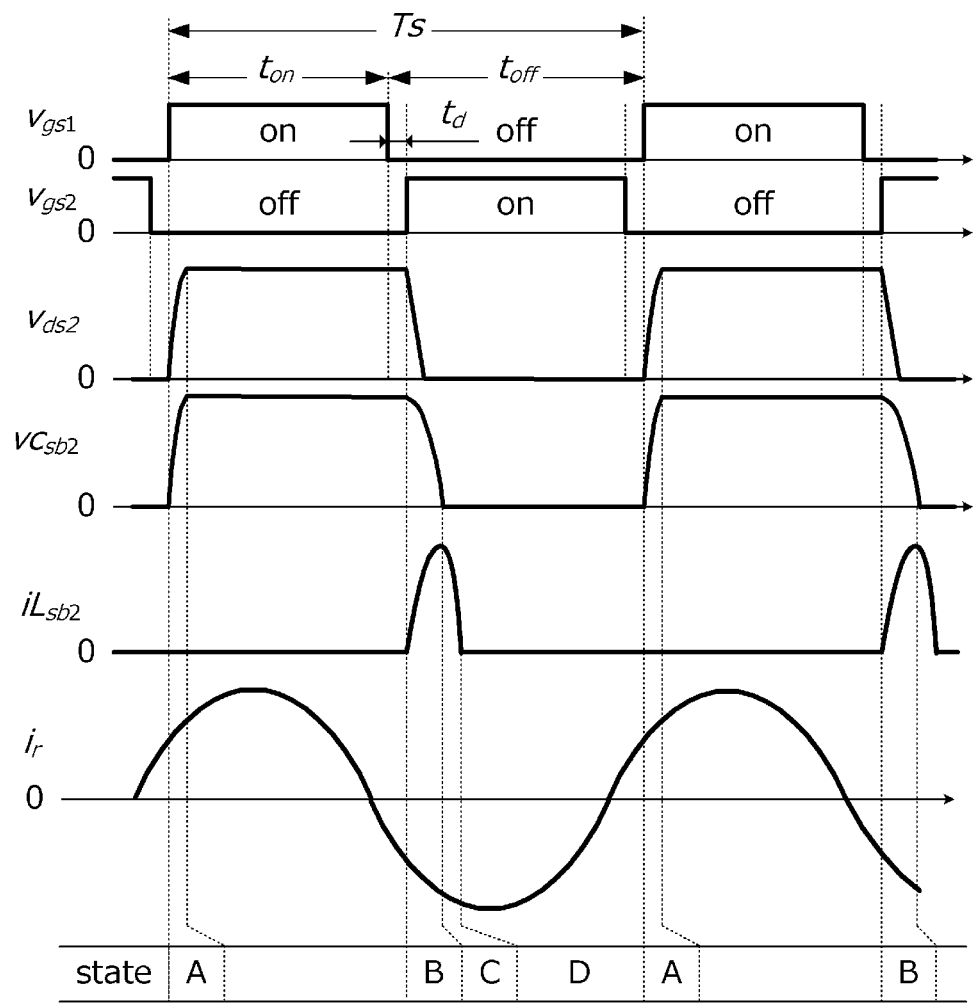
FIG. 4 is a waveform chart of individual units at the time when the power transmission device illustrated in FIG. 1 performs a non-ZVS operation.

FIG. 4 is a waveform chart of individual units at the time when the power transmission device PTU illustrated in FIG. 1 performs a non-zero voltage switching (non-ZVS) operation. In FIG. 4, VCsb2 represents the voltage across the second capacitor Csb2, and iLsb2 represents the current flowing in the inductor Lsb2. The other signs are the same as those described above with reference to FIG. 2.

Figure 3A:
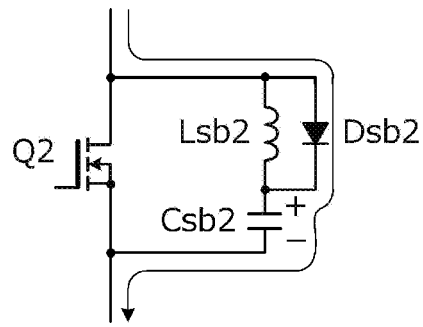
FIGS. 3A to 3D are diagrams illustrating operation of a snubber circuit that is connected to a high-side switch circuit.

When the switch element Q1 is turned ON and the switch element Q2 is turned OFF, as illustrated in FIG. 3A, the current flowing in the switch element Q2 flows through the diode Dsb2 and the second capacitor Csb2.

Figure 3B:
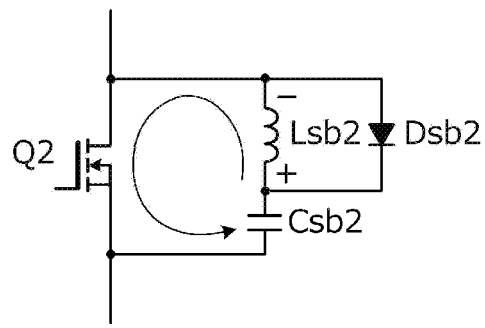
Figure 3C:
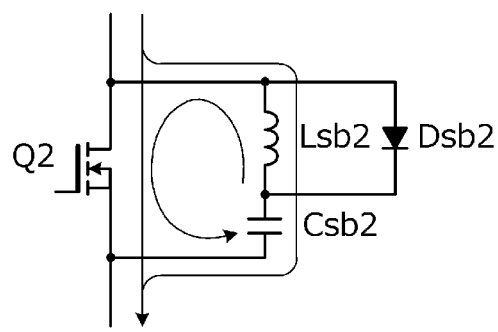
Figure 3D:
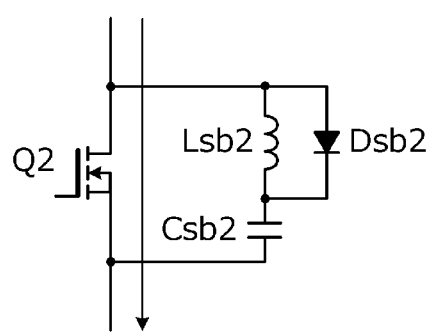

After that, when the switch element Q2 is turned ON, at the initial stage, as illustrated in FIG. 3B, charge charged in the second capacitor Csb2 is discharged through the inductor Lsb2. At this time, the inductor Lsb2 is excited, the discharged current flows slowly in a sine wave shape, and charge charged in the second capacitor Csb2 is discharged. After that, the current flowing in the power circuit cancels out the current flowing in the inductor Lsb2. Until a state in which no current flows in the inductor Lsb2 is obtained, the state illustrated in FIG. 3C is reached, and then current flows only in the switch element Q2 as illustrated in FIG. 3D. After that, the state illustrated in FIG. 3A is returned.

Operation similar to that described above is performed in a low-side snubber circuit connected to the low-side switch circuit.

As described above, the diodes Dsb1 and Dsb2 form charging current paths for the capacitors Csb1 and Csb2. Currents immediately after the switch elements Q1 and Q2 are turned OFF go through a period during which the currents flow as charging and discharging currents for the capacitors Csb1 and Csb2 and the inductors Lsb1 and Lsb2 in the snubber circuits. Therefore, a corner part of the waveform of the voltage output from the switching circuit becomes smooth, that is, a time change in the current flowing in the switch circuit becomes slow, and the current it flowing in the power transmission coil Lp in FIG. 2 exhibits a waveform approximated to a sine wave form.

Furthermore, the power transmission device PTU according to this embodiment further includes the third capacitor Csb3 that is connected between the second end of the first capacitor Csb1 and the second end of the second capacitor Csb2. The third capacitor Csb3 allows connection between different potentials of the first capacitors Csb1 and Csb2 of the two snubber circuits SB1 and SB2. Therefore, charge charged in and discharged from the capacitors Csb1 and Csb2 are balanced through the third capacitor Csb3. As a result, the ratio of time during which the voltage across the first capacitor Csb1 changes and the ratio of time during which the voltage across the second capacitor Csb2 changes become the same, and generation of a harmonic wave current can be reduced.

Figure 11:
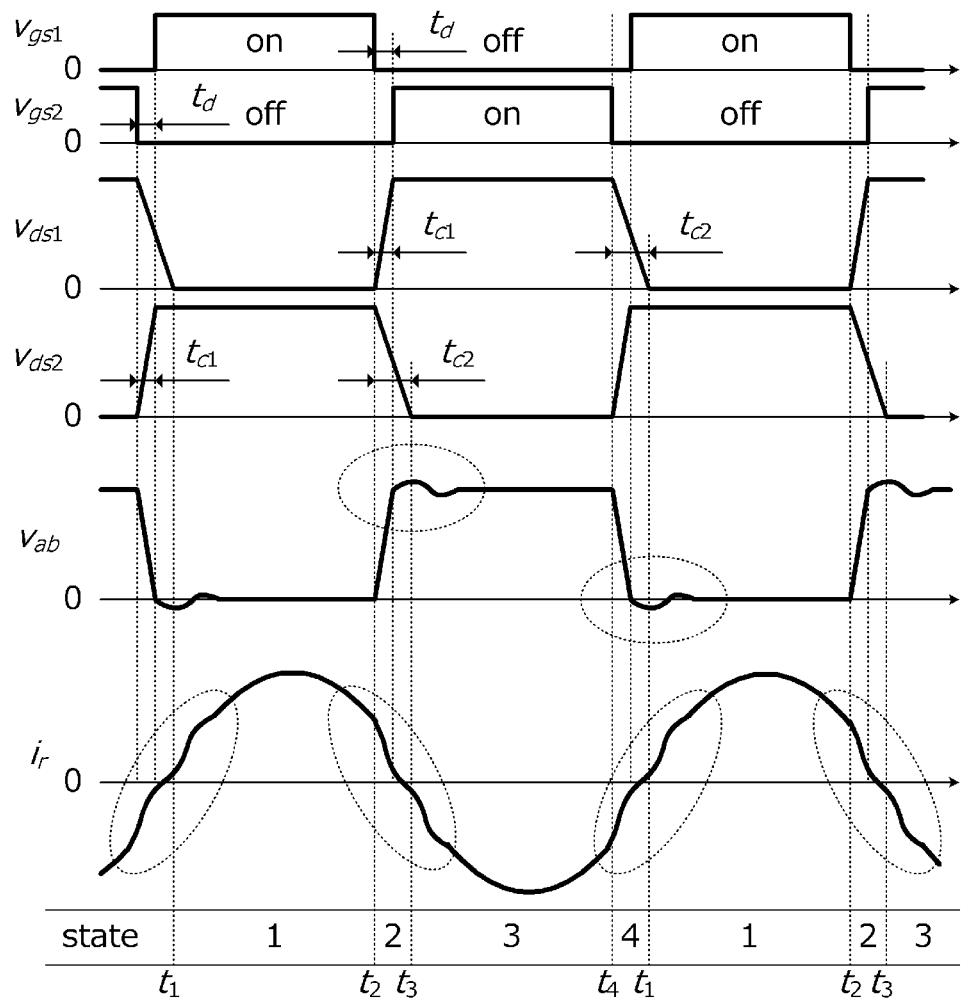
FIG. 11 is a waveform chart of individual units of a power transmission device according to a comparative example not including a snubber circuit.

A waveform chart of individual units of a power transmission device that does not include the third capacitor Csb3 for the snubber circuits is illustrated in FIG. 11. This waveform chart is a diagram corresponding to the waveform chart illustrated in FIG. 2. In the case where the third capacitor Csb3 for the snubber circuits is not provided, if the inductances of the inductors Lsb1 and Lsb2 are different or if the turn-ON speed and the turn-OFF speed of the switch elements are different, such a difference between the inductances or a difference between the switching speeds has adverse influence, and the ratio of time during which the voltage across the first capacitor Csb1 changes (a rise time in a half period and a fall time in a half period) and the ratio of time during which the voltage across the second capacitor Csb2 changes (a rise time in a half period and a fall time in a half period) are unbalanced. In the example illustrated in FIG. 11, the turn-OFF time tc1 and the turn-ON time tc2 are different between the switch elements Q1 and Q2, and the rising slope and the falling slope are different between Vds1 and Vds2. As a result, as illustrated in FIG. 11, a voltage disturbance occurs immediately after rising of the voltage Vab and immediately after falling of the voltage Vab. Furthermore, in accordance with this, the current ir flowing in the power transmission coil Lp exhibits a waveform distorted relative to a sine wave form.

In contrast, according to this embodiment, as illustrated in FIG. 2, the turn-OFF time tc and the turn-ON time tc are the same between the switch elements Q1 and Q2, and the third capacitor Csb3 makes the ratio of time during which the voltage across the first capacitor Csb1 changes and the ratio of time during which the voltage across the second capacitor Csb2 changes approximated to each other. Therefore, the ratio of time during which the voltage Vds1 across the switch element Q1 changes and the ratio of time during which the voltage Vds2 across the switch element Q2 changes become the same, and a change in the voltage Vds1 and a change in the voltage Vds2 are balanced. That is, the voltage Vds1 and the voltage Vds2 exhibit a periodical trapezoidal wave form with no distortion, no overshoot, or no undershoot. As a result, harmonic wave components of the resonant current ir can be reduced. Consequently, radiation noise and power loss caused by a harmonic wave current can be reduced.

The third capacitor Csb3 acts such that imbalance between the ratio of time during which the voltage across the first capacitor Csb1 changes and the ratio of time during which the voltage across the second capacitor Csb2 changes is corrected. Specifically, in an example of a period from time t2 to time t3 illustrated in FIG. 11, the turn-OFF time tc1 of the switch element Q1 and the turn-ON time tc2 of the switch element Q2 are different. The time tc1 is short, and the time tc2 is long. In this case, to make a correction so that the time tc1 is extended and the time tc2 is shortened, a current for correcting a voltage change needs to flow from the first capacitor Csb1 in the snubber circuit to the second capacitor Csb2 in the snubber circuit through the third capacitor Csb3. In this case, the current for correction can be represented in an expression below, where the capacitance of the first capacitor Csb1 is represented by Csb1, the capacitance of the second capacitor Csb2 is represented by Csb2, and the capacitance of the third capacitor Csb3 is represented by Csb3.

$$\frac{Csb1\frac{dVds1}{dt} + Csb2\frac{dVds2}{dt}}{2} \quad \text{[Equation 1]}$$

There is a need to cause a correction current to flow in the third capacitor Csb3. Therefore, it is desirable that the capacitance Csb3 of the third capacitor Csb3 be set to satisfy an expression below, where the voltage across the capacitor C3 is represented by VCsb3.

$$Csb3 \geq \frac{\left(Csb1\frac{dVds1}{dt} + Csb2\frac{dVds2}{dt}\right)}{2\frac{dVCsb3}{dt}} \quad \text{[Equation 2]}$$

Furthermore, in the case where capacitances of the first capacitor Csb1 and the second capacitor Csb2 are the same and half of the difference in voltage change with time (d Vds1/dt+d Vds2/dt) is the same as d VCsb3/dt, where the capacitances are represented by Csb, an expression below is satisfied.

Csb3≥Csb

Based on the previous expression, the capacitance Csb3 of the third capacitor Csb3 may be set equal to or more than the capacitance of the first capacitor Csb1 or the second capacitor Csb2. In this case, the voltage of the third capacitor Csb3 varies to the voltage of the DC power supply Vi. Furthermore, it may be understood that, by setting the capacitance of the third capacitor Csb3 to be sufficiently higher than the capacitance of the first capacitor Csb1 or the second capacitor Csb2, fluctuations in the voltage of the third capacitor Csb3 can be reduced, and harmonic wave current generated by the switching circuit can be effectively reduced.

Second Embodiment

In a second embodiment, a high frequency power supply device in which a configuration of a snubber circuit is different from that in the first embodiment will be described.

Figure 5:
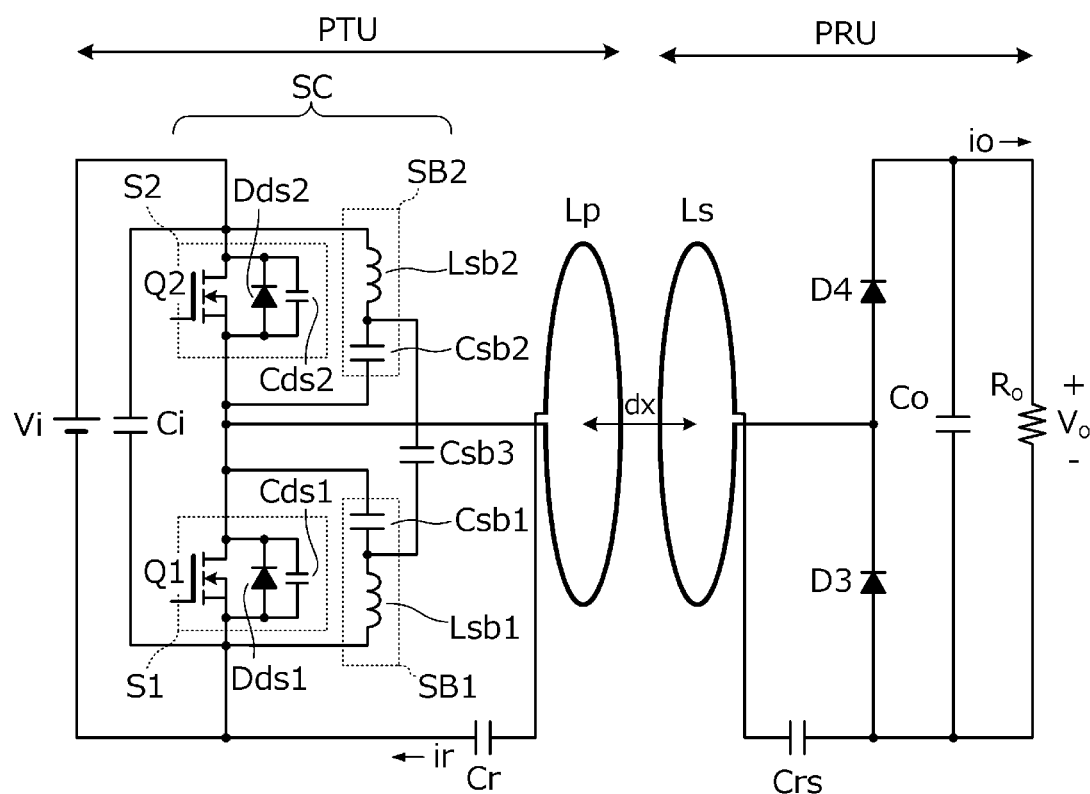
FIG. 5 is a circuit diagram of a power transfer system that includes a high frequency power supply device according to a second embodiment.

FIG. 5 is a circuit diagram of a power transfer system 121 that includes the high frequency power supply device according to the second embodiment. The power transfer system 121 is different from the power transfer system 111 illustrated in FIG. 1 in a configuration of, in particular, a snubber circuit of the switching circuit SC of the power transmission device PTU.

In FIG. 5, the snubber circuit SB1 that is connected between both ends of the low-side switch circuit S1 and the snubber circuit SB2 that is connected between both ends of the high-side switch circuit S2 are provided.

The snubber circuit SB1 includes a series circuit including the inductor Lsb1 and the first capacitor Csb1. In a similar manner, the snubber circuit SB2 includes a series circuit including the inductor Lsb2 and the second capacitor Csb2. Furthermore, the power transmission device PTU further includes the third capacitor Csb3 that is connected between the second end of the first capacitor Csb1 and the second end of the second capacitor Csb2. Neither the diode Dsb1 nor the diode Dsb2 illustrated in FIG. 1 is present. The other configurations are the same as those described in the first embodiment.

Figure 6:
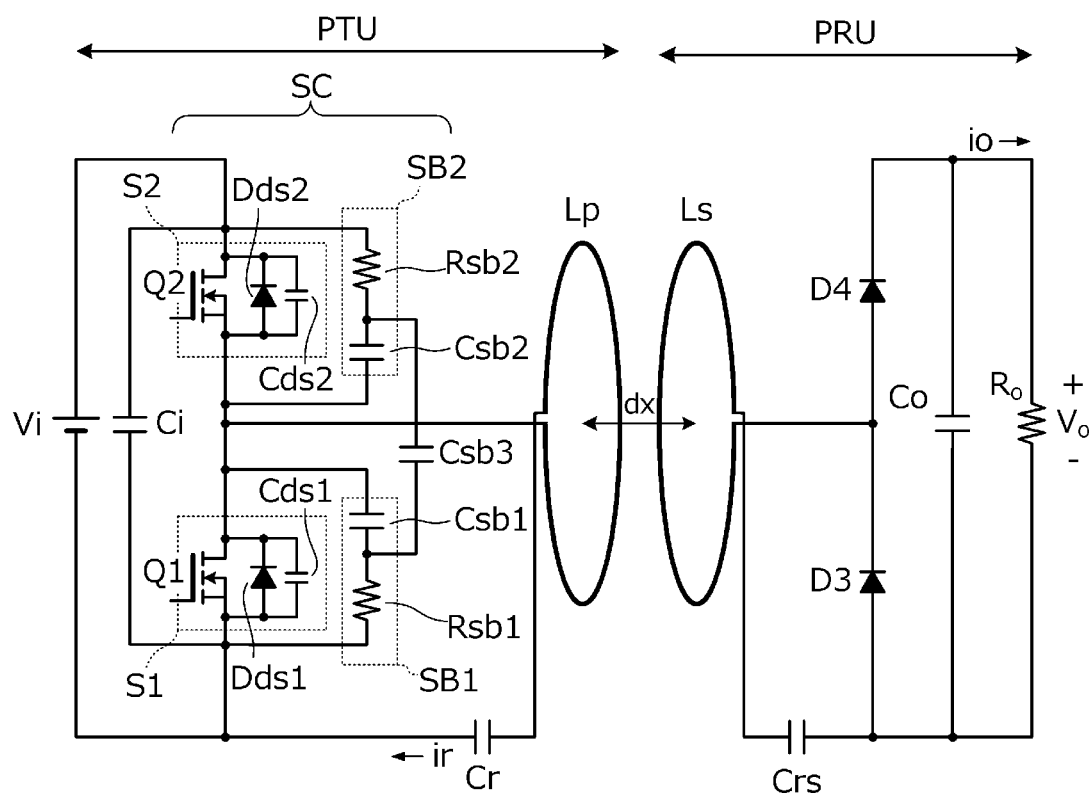
FIG. 6 is a circuit diagram of a power transfer system that includes a different high frequency power supply device according to the second embodiment.

FIG. 6 is a circuit diagram of a power transfer system 122 that includes a different high frequency power supply device according to the second embodiment. In the power transmission device PTU in the power transfer system 122, the inductors Lsb1 and Lsb2 illustrated in FIG. 5 are replaced by resistor elements Rsb1 and Rsb2. The other configurations are the same as those illustrated in FIG. 5.

According to this embodiment, in the case where the impedances of the inductors Lsb1 and Lsb2 or the resistor elements Rsb1 and Rsb2 are different between the low side and the high side, a problem in which adverse influence of the difference in the impedance causes the ratio of time during which the voltage across the first capacitor Csb1 changes and the ratio of time during which the voltage across the second capacitor Csb2 changes to be unbalanced, can be solved, as in the first embodiment.

Third Embodiment

In a third embodiment, a high frequency power supply device in which a configuration of a snubber circuit is different from that in the first and second embodiments will be described.

Figure 7:
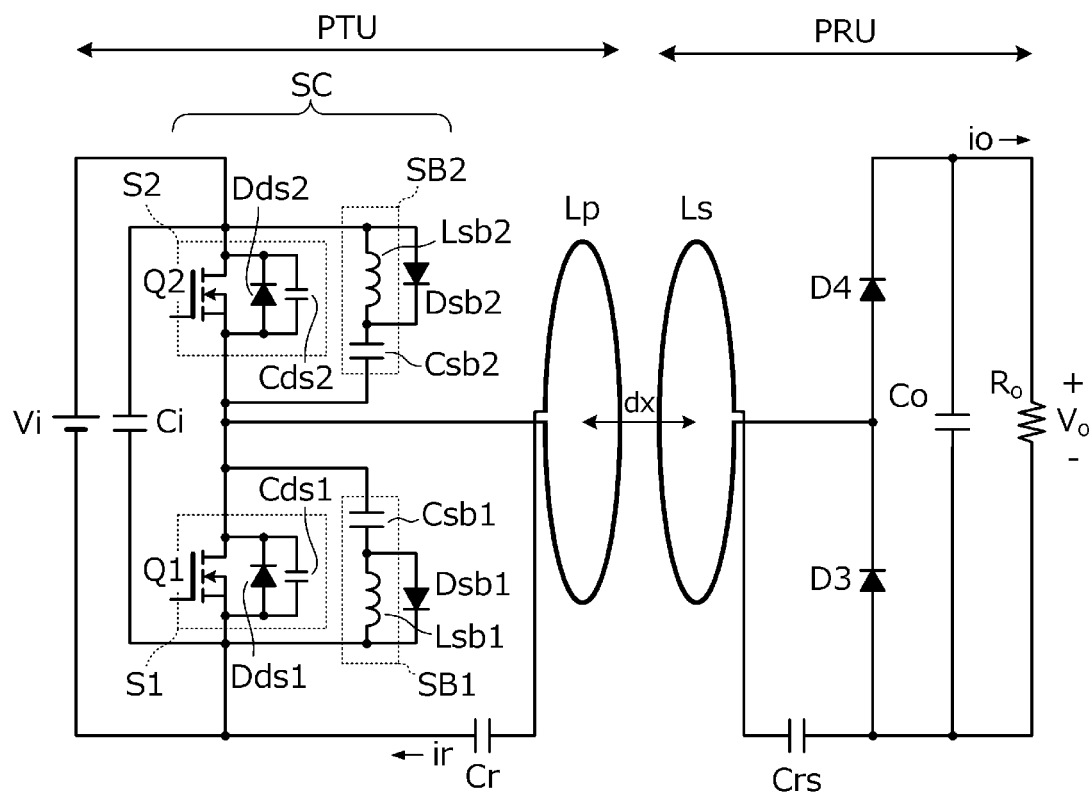
FIG. 7 is a circuit diagram of a power transfer system that includes a high frequency power supply device according to a third embodiment.

FIG. 7 is a circuit diagram of a power transfer system 131 that includes the high frequency power supply device according to the third embodiment.

In FIG. 7, the snubber circuit SB1 that is connected between both ends of the low-side switch circuit S1 and the snubber circuit SB2 that is connected between both ends of the high-side switch circuit S2 are provided.

The snubber circuit SB1 includes a series circuit including the inductor Lsb1 and the first capacitor Csb1 and the diode Dsb1 that is connected in parallel with the inductor Lsb1. In a similar manner, the snubber circuit SB2 includes a series circuit including the inductor Lsb2 and the second capacitor Csb2 and the diode Dsb2 that is connected in parallel with the inductor Lsb2. The power transfer system 131 is different from the power transfer system 111 illustrated in FIG. 1 in that the third capacitor Csb3 is not present in the switching circuit SC of the power transmission device PTU.

In the case where inductances of the inductors Lsb1 and Lsb2 are substantially the same or the case where the turn-ON speed and the turn-OFF speed of the switch elements are substantially the same, there is no difference in inductance or switching speed. Therefore, there is little effect of the third capacitor Csb3. Thus, depending on the conditions, the third capacitor Csb3 is not necessary.

Next, a power conversion operation in lagging of a resonant current and a power conversion operation in leading of a resonant current will be described. FIGS. 8A and 8B and FIGS. 9A and 9B are waveform charts regarding the power transmission device PTU according to this embodiment, and FIGS. 12A and 12B and FIGS. 13A and 13B are waveform charts regarding a power transmission device according to a comparative example. In the power transmission device according to this comparative example, neither the diode Dsb1, nor the diode Dsb2, nor the third capacitor Csb3 is provided, unlike in FIG. 1. In the actual circuit, this configuration equivalently corresponds to a circuit including neither the snubber circuit SB1 nor the snubber circuit SB2 in FIG. 1. Furthermore, the waveform chart of the individual units indicate waveforms in an equivalent circuit in which a load is directly connected in series with the power transmission coil Lp.

Figure 8A:
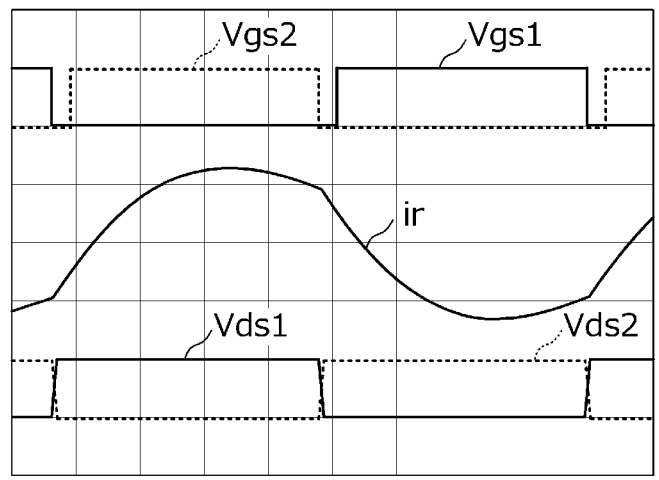
FIGS. 8A and 8B are waveform charts in a zero voltage switching operation of a power transmission device according to the third embodiment.
Figure 8B:
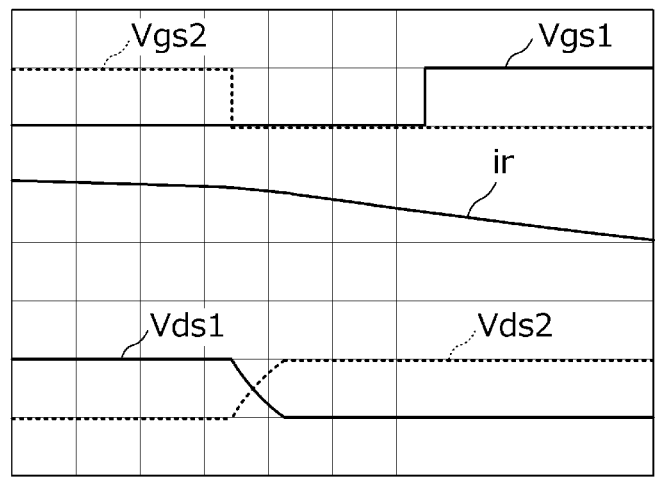

FIGS. 8A and 8B and FIGS. 12A and 12B are waveform charts of the individual units in a state in which the resonant circuit including the power transmission coil Lp and the resonant capacitor Cr can be viewed like an inductive impedance at a switching frequency when viewed from the switching circuit SC (a state in which the switching frequency of the switching circuit SC is higher than the resonant frequency of the resonant circuit). FIG. 8B is a diagram in which the time axis in FIG. 8A is enlarged.

As described above, in the state in which the resonant circuit including the power transmission coil Lp and the resonant capacitor Cr can be viewed like an inductive impedance when viewed from the switching circuit SC, zero voltage switching (ZVS) is achieved.

Figure 9A:
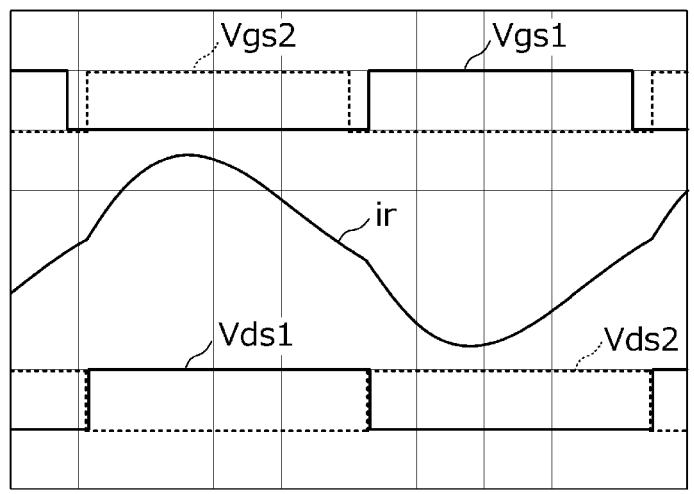
FIGS. 9A and 9B are waveform charts in a non-zero voltage switching operation of the power transmission device according to the third embodiment.
Figure 9B:
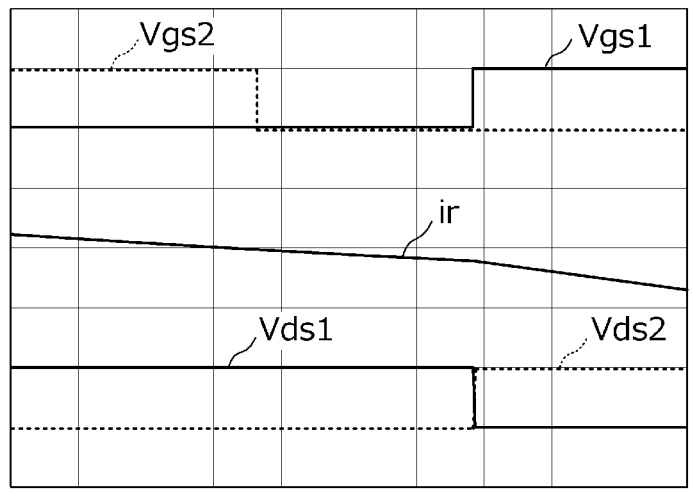

FIGS. 9A and 9B and FIGS. 13A and 13B are waveform charts of the individual units in a state in which the resonant circuit including the power transmission coil Lp and the resonant capacitor Cr can be viewed like a capacitive impedance at a switching frequency when viewed from the switching circuit SC (a state in which the switching frequency of the switching circuit SC is higher than the resonant frequency of the resonant circuit). FIG. 9B is a diagram in which the time axis in FIG. 9A is enlarged.

As described above, in the state in which the resonant circuit including the power transmission coil Lp and the resonant capacitor Cr can be viewed like a capacitive impedance when viewed from the switching circuit SC, zero voltage switching (ZVS) is not achieved.

In FIGS. 8A and 8B, and FIGS. 9A and 9B, the voltage Vgs1 represents the voltage between the gate and source of the low-side switch element Q1, and the voltage Vgs2 represents the voltage between the gate and source of the high-side switch element Q2. The voltage Vds1 represents the voltage between the drain and source of the low-side switch element Q1, and the voltage Vds2 represents the voltage between the drain and source of the high-side switch element Q2. Furthermore, the current ir represents a current flowing in the power transmission coil Lp.

In the case where the inductance of the power transmission coil Lp is represented by Lp, an equivalent resistance component of a load directly connected in series with the power transmission coil Lp is represented by Rac, the capacitance of the resonant capacitor Cr is represented by Cr, the inductances of the inductors Lsb1 and Lsb2 are represented by Lsb, the capacitances of the capacitors Csb1 and Csb2 are represented by Csb, the capacitance of the third capacitor Csb3 is represented by Csb3, and the capacitances of the capacitors Cds1 and Cds2 are represented by Cds, values of the individual elements are represented as below.

Lp=352 nH
Rac=10 Ω
Cds=6.5 pF
Csb=30 pF
Csb3=30 pF
Lsb=50 nH

In the case where the resonant frequency fss of a snubber circuit is represented by $$fss = 1/(2\pi\sqrt{Lsb \cdot Csb})$$
$$= 130 \text{ MHz},$$

the switching frequencies fs of the switch elements Q1 and Q2 is set to 6.78 MHz, and the capacitance of the resonant capacitor Cr is represented by Cr, in the examples illustrated in FIGS. 8A and 8B, and FIGS. 12A and 12B, the resonant frequency is set to 5.37 MHz, where Cr is set to 2500 pF. Furthermore, in the examples illustrated in FIGS. 9A and 9B, and FIGS. 13A and 13B, the resonant frequency is set to 7.44 MHz, where Cr is set to 1300 pF.

Figure 12A:
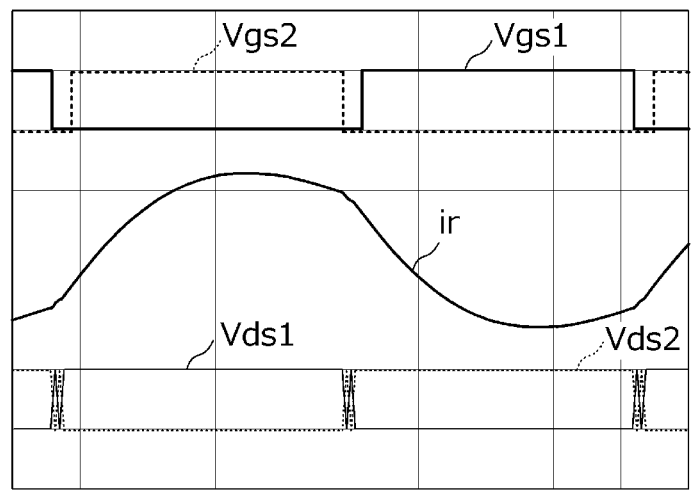
FIGS. 12A and 12B are waveform charts of individual units at the time when the power transmission device according to the comparative example performs a zero voltage switching operation.
Figure 12B:
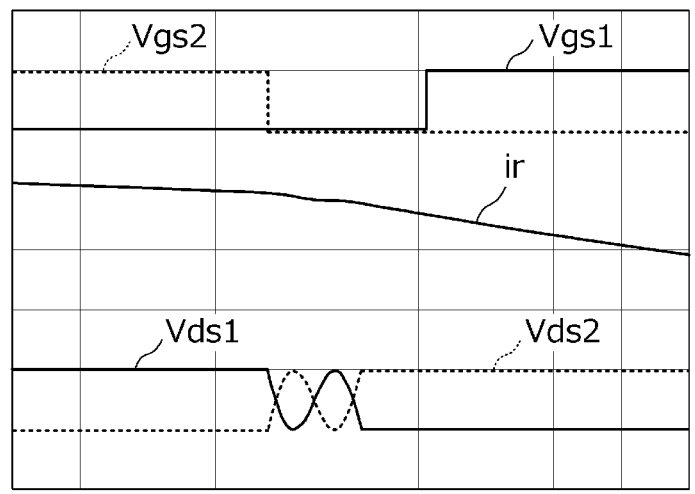
Figure 13A:
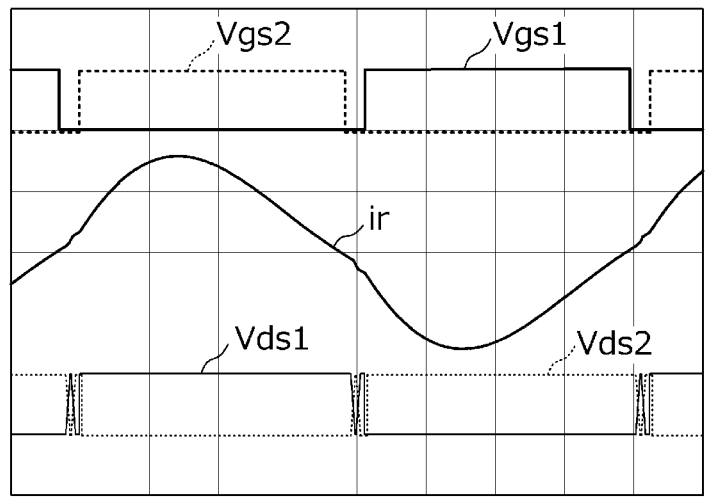
FIGS. 13A and 13B are waveform charts of individual units at the time when the power transmission device according to the comparative example performs a non-zero voltage switching operation.
Figure 13B:
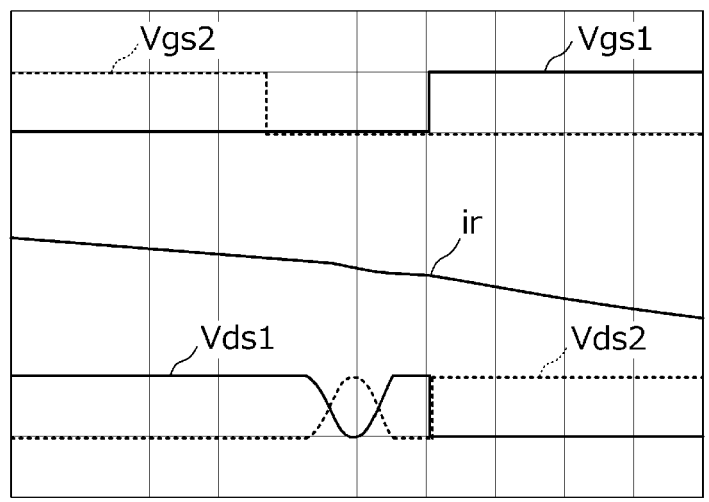

In the power transmission device according to the comparative example, as illustrated in FIGS. 12A and 12B, and FIGS. 13A and 13B, vibrations occur at the time when the voltage Vds1 and Vds2 change, and a harmonic wave current is generated at this time. Thus, radiation noise increases. Furthermore, power loss caused by the harmonic wave current increases. In particular, as illustrated in FIGS. 12A and 12B, although a ZVS operation is achieved, a harmonic wave current is generated. Regarding the harmonic wave current, the vibration frequencies of the voltages Vds1 and Vds2 increase as the resonant frequency fss of a snubber circuit increases, and the increase in the vibration frequency causes distortion of the waveform of the resonant current.

In contrast, in the lagging of the current illustrated in FIGS. 8A and 8B, the voltages Vds1 and Vds2 change slowly with less vibrations, and generation of a harmonic wave current (a harmonic wave component contained in the current ir) can thus be reduced.

Furthermore, in the lagging of the current, by the end of a half wave of a sine wave of the current ir, the next half wave starts. Accordingly, after a forward current starts to flow in the diodes Dds1 and Dds2, the switch elements Q1 and Q2 are turned ON. Therefore, a zero voltage switching (soft switching) operation is attained, and switching loss can thus be reduced.

Furthermore, in the leading of the current illustrated in FIGS. 9A and 9B, a non-zero voltage switching operation is performed. However, the voltages Vds1 and Vds2 change with inclination, and no vibration occurs. Therefore, although a non-ZVS operation is performed, generation of a harmonic wave current (a harmonic wave component contained in the current ir) can be reduced.

When the switch element Q1 is turned ON and the switch element Q2 is turned OFF, a current keeps flowing to the diode Dds2 that is connected in parallel with the switch element Q2. After that, when the switch element Q1 is turned ON, as illustrated in FIG. 3A, in the snubber circuit SB2, a current flows through the diode Dsb2 and the second capacitor Csb2, the second capacitor Csb2 is charged, and the capacitor Cds2 is charged. In contrast, in the snubber circuit SB1, at the initial stage, examination may be performed by replacing the snubber circuit SB2 with the snubber circuit SB1 as in FIG. 3B, and charge charged in the first capacitor Csb1 is discharged through the inductor Lsb1. At this time, the inductor Lsb1 is excited, the discharged current flows slowly in a sine wave shape, and charge charged in the first capacitor Csb1 is discharged. At the same time, the capacitor Cds1 is also discharged. After that, the current flowing in the power circuit cancels out the current flowing in the inductor Lsb1. Until a state in which no current flows in the inductor Lsb1 is obtained, a state similar to the state illustrated in FIG. 3C is reached, and then current flows only in the switch element Q1, as in FIG. 3D.

As described above, no vibration occurs by turning ON and turning OFF of the switch element Q1 and the switch element Q2, and generation of a harmonic wave current (a harmonic wave component contained in the current ir) can be reduced.

In place of the inductors Lsb1 and Lsb2 illustrated in FIG. 7, the resistor elements Rsb1 and Rsb2 illustrated in FIG. 6 may be provided.

According to this embodiment, the voltage across the capacitor Csb1 and the voltage across the capacitor Csb2 are connected to the DC power supply Vi with the diodes Dsb1 and Dsb2, respectively, interposed therebetween. Therefore, at the time when a switch element to which a snubber circuit is connected is turned OFF, rising of the voltage of a snubber capacitor is made slow so that switching loss can be reduced, and switching surge generated at both ends of the switch element can be reduced. Furthermore, at the time when the switch element is turned ON, even under a condition for a non-zero voltage switching operation, the impedances of the inductors Lsb1 and Lsb2 or the resistor elements Rsb1 and Rsb2 reduce current flowing into the switch element, and turn-on switching loss in the switch element can be reduced. As described above, a problem of switching loss and generation of switching noise in the switch element, power loss, and electromagnetic interference noise can be solved.

As in this embodiment, in the case where snubber circuits include the series circuits including the capacitors Csb1 and Csb2 and the inductors Lsb1 and Lsb2 or the series circuits including the capacitors Csb1 and Csb2 and the resistor elements Rsb1 and Rsb2 and the diodes Dsb1 and Dsb2 that are connected in parallel to the inductors Lsb1 and Lsb2 or the resistor elements Rsb1 and Rsb2 in a direction in which a current for charging the capacitors Csb1 and Csb2 flows, the snubber circuits may be provided one of the high side and the low side.

Fourth Embodiment

In a fourth embodiment, a high frequency power supply device in which a configuration of a switching circuit is different from that in the first to third embodiments will be described.

Figure 10:
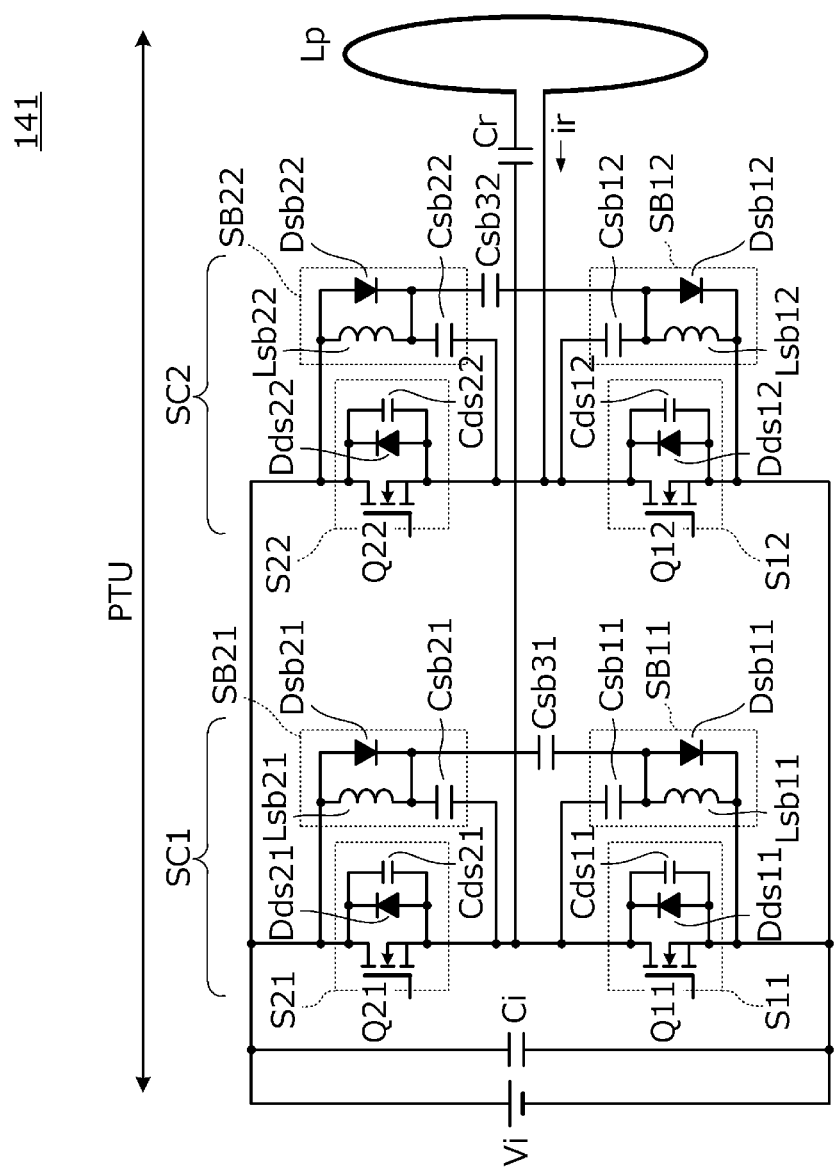
FIG. 10 is a circuit diagram of a power transfer system that includes a high frequency power supply device according to a fourth embodiment.

FIG. 10 is a circuit diagram of a power transfer system 141 that includes a high frequency power supply device according to the fourth embodiment.

The power transmission device PTU includes the DC power supply Vi and switching circuits SC1 and SC2 that are connected to an output side of the DC power supply Vi and generate high frequency power. The switching circuits SC1 and SC2 form a switching circuit of a full-bridge type.

The switching circuit SC1 includes a low-side switch circuit S11 and a high-side switch circuit S21. The low-side switch circuit S11 includes a low-side switch element Q11, a diode Dds11 connected across the low-side switch element Q11, and a capacitor Cds11. In a similar manner, the high-side switch circuit S21 includes a high-side switch element Q21, a diode Dds21 connected across the high-side switch element Q21, and a capacitor Cds21.

The switching circuit SC2 includes a low-side switch circuit S12 and a high-side switch circuit S22. The low-side switch circuit S12 includes a low-side switch element Q12, a diode Dds12 connected across the low-side switch element Q12, and a capacitor Cds12. In a similar manner, the high-side switch circuit S22 includes a high-side switch element Q22, a diode Dds22 connected across the high-side switch element Q22, and a capacitor Cds22.

A series circuit including the power transmission coil Lp and the resonant capacitor Cr is connected between a connecting point between the high-side switch circuit S21 and the low-side switch circuit S11 and a connecting point between the high-side switch circuit S22 and the low-side switch circuit S12.

The switching circuit SC1 includes a snubber circuit SB11 connected between both ends of the low-side switch circuit S11 and a snubber circuit SB21 connected between both ends of the high-side switch circuit S21. The switching circuit SC2 includes a snubber circuit SB12 connected between both ends of the low-side switch circuit S12 and a snubber circuit SB22 connected between both ends of the high-side switch circuit S22.

The snubber circuit SB11 includes a series circuit including an inductor Lsb11 and a first capacitor Csb11 and a diode Dsb11 connected in parallel with the inductor Lsb11. In a similar manner, the snubber circuit SB21 includes a series circuit including an inductor Lsb21 and a second capacitor Csb21 and a diode Dsb21 connected in parallel with the inductor Lsb21.

A third capacitor Csb31 is connected between a second end of the first capacitor Csb11 and a second end of the second capacitor Csb21. In a similar manner, a third capacitor Csb32 is connected between a second end of the first capacitor Csb12 and a second end of the second capacitor Csb22.

In FIG. 10, a configuration of a snubber circuit may be the same as that of the circuit described in the second or third embodiment.

As described above, the present disclosure may be applied in a similar manner to a switching circuit of a full-bridge type, and similar effects can be achieved.

In the example described above, application to a wireless power transfer system that includes the power transmission coil Lp and the power reception coil Ls is described as an example. The present disclosure is also applicable to a DC-DC converter. For example, a DC-DC converter may be configured such that the power transmission coil Lp and the power reception coil Ls illustrated in FIG. 1 are replaced by a converter transformer primary coil and a converter transformer secondary coil. In a DC-DC converter including such a high frequency power generation circuit, similar operational effects can be achieved.

Furthermore, in each of the embodiments described above, a "DC power supply" includes a circuit that outputs a DC voltage, a battery, and a DC voltage obtained by rectifying and smoothing a commercial AC.

Finally, the embodiments described above are merely illustrative in all aspects and should not be recognized as being restrictive. Variations and modifications can be made by those skilled in the art in an appropriate manner. The scope of the present disclosure is defined not by the embodiments described above but by the scope of the claims. Furthermore, the scope of the present disclosure is intended to include modifications to embodiments within the scope of the claims and the equivalents thereto.

What is claimed is:

1. A high frequency power supply device comprising:
   a high frequency power generation circuit that is connected to a DC power supply, includes a low-side switch element and a high-side switch element, and generates high frequency power by switching of the low-side switch element and the high-side switch element;
   a low-side snubber circuit that is connected between both ends of the low-side switch element; and
   a high-side snubber circuit that is connected between both ends of the high-side switch element,
   wherein
   the low-side snubber circuit includes a series circuit including a first capacitor and a first impedance element,
   the high-side snubber circuit includes a series circuit including a second capacitor and a second impedance element,
   a first end of the first capacitor and a first end of the second capacitor are connected to a connecting point between the low-side switch element and the high-side switch element, and
   the high frequency power supply device further comprises a third capacitor that is connected between a second end of the first capacitor and a second end of the second capacitor.

2. The high frequency power supply device according to claim 1, wherein
   a capacitance of the third capacitor is set to a value that makes a ratio of time during which a voltage across the first capacitor changes and a ratio of time during which a voltage across the second capacitor changes the same.

3. The high frequency power supply device according to claim 1, wherein
   the first impedance element or the second impedance element is a resistor element.

4. The high frequency power supply device according to claim 1, wherein
   the first impedance element or the second impedance element is an inductor.

5. The high frequency power supply device according to claim 1, further comprising:
   a first diode that is connected in parallel between both ends of the first impedance element in a direction in which a current for charging the first capacitor flows, or a second diode that is connected in parallel between both ends of the second impedance element in a direction in which a current for charging the second capacitor flows.

6. The high frequency power supply device according to claim 1, wherein
   the low-side switch element includes a diode that is connected in parallel with the low-side switch element,
   the high-side switch element includes a diode that is connected in parallel with the high-side switch element,
   under a condition in which a high frequency current flowing in the low-side switch element and the high-side switch element lags a high frequency voltage output from the high-side switch element and the low-side switch element, capacitances of the first capacitor and the second capacitor are set to values for providing a gentle rising slope or a gentle falling slope of a trapezoidal wave voltage, which is the high frequency voltage, while a zero voltage switching operation being attained, and
   under a condition in which the high frequency current leads the high frequency voltage, the capacitances of the first capacitor and the second capacitor are set to values for providing a gentle rising slope or a gentle falling slope of the trapezoidal wave voltage while a non-zero voltage switching operation being performed.

7. The high frequency power supply device according to claim 1, wherein
   the low-side switch element and the high-side switch element is a MOS-FET including a structurally configured parasitic diode.

8. The high frequency power supply device according to claim 1, wherein
   the low-side switch element and the high-side switch element are compound semiconductor elements.

9. The high frequency power supply device according to claim 2, wherein
   the first impedance element or the second impedance element is a resistor element.

10. The high frequency power supply device according to claim 2, wherein
    the first impedance element or the second impedance element is an inductor.

11. The high frequency power supply device according to claim 2, further comprising:
    a first diode that is connected in parallel between both ends of the first impedance element in a direction in which a current for charging the first capacitor flows, or a second diode that is connected in parallel between both ends of the second impedance element in a direction in which a current for charging the second capacitor flows.

12. The high frequency power supply device according to claim 2, wherein
    the low-side switch element includes a diode that is connected in parallel with the low-side switch element,
    the high-side switch element includes a diode that is connected in parallel with the high-side switch element,
    under a condition in which a high frequency current flowing in the low-side switch element and the high-side switch element lags a high frequency voltage output from the high-side switch element and the low-side switch element, capacitances of the first capacitor and the second capacitor are set to values for providing a gentle rising slope or a gentle falling slope of a trapezoidal wave voltage, which is the high frequency voltage, while a zero voltage switching operation being attained, and
    under a condition in which the high frequency current leads the high frequency voltage, the capacitances of the first capacitor and the second capacitor are set to values for providing a gentle rising slope or a gentle falling slope of the trapezoidal wave voltage while a non-zero voltage switching operation being performed.

13. A high frequency power supply device comprising:
a high frequency power generation circuit that is connected to a DC power supply, includes a low-side switch element and a high-side switch element, and generates high frequency power by switching of the low-side switch element and the high-side switch element; and
a snubber circuit that is connected at least between both ends of the low-side switch element or between both ends of the high-side switch element, wherein
the snubber circuit includes
 a series circuit including a capacitor and an inductor or a series circuit including a capacitor and a resistor, and
 a diode that is connected in parallel with the inductor or the resistor in a direction in which a current for charging the capacitor flows,
the low-side switch element includes a diode that is connected in parallel with the low-side switch element,
the high-side switch element includes a diode that is connected in parallel with the high-side switch element,
under a condition in which a high frequency current flowing in the low-side switch element and the high-side switch element lags a high frequency voltage output from the high-side switch element and the low-side switch element, a capacitance of the capacitor included in the snubber circuit is set to a value for providing a gentle rising slope or a gentle falling slope of a trapezoidal wave voltage, which is the high frequency voltage, while a zero voltage switching operation being attained, and
under a condition in which the high frequency current leads the high frequency voltage, the capacitance of the capacitor included in the snubber circuit is set to a value for providing a gentle rising slope or a gentle falling slope of the trapezoidal wave voltage while a non-zero voltage switching operation being performed.

14. The high frequency power supply device according to claim 13, wherein
the low-side switch element and the high-side switch element is a MOS-FET including a structurally configured parasitic diode.

15. The high frequency power supply device according to claim 13, wherein
the low-side switch element and the high-side switch element are compound semiconductor elements.

16. The high frequency power supply device according to claim 14, wherein
the low-side switch element and the high-side switch element are compound semiconductor elements.

* * * * *